(12) United States Patent  
Marappan et al.

(10) Patent No.: US 11,204,699 B2
(45) Date of Patent: Dec. 21, 2021

(54) STORAGE SYSTEM PORT MAINTENANCE INFORMATION SHARING WITH HOST DEVICE

(71) Applicant: EMC IP Holding Company LLC, Hopkinton, MA (US)

(72) Inventors: Gopinath Marappan, Coimbatore (IN); Madhu Tarikere, Bangalore (IN); Vinay G. Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/810,025

(22) Filed: Mar. 5, 2020

(65) Prior Publication Data
US 2021/0278975 A1    Sep. 9, 2021

(51) Int. Cl.
G06F 3/06        (2006.01)
G06F 13/16       (2006.01)

(52) U.S. Cl.
CPC ............ *G06F 3/0617* (2013.01); *G06F 3/067* (2013.01); *G06F 3/0655* (2013.01); *G06F 13/16* (2013.01); *G06F 2213/16* (2013.01)

(58) Field of Classification Search
CPC ...... G06F 3/0617; G06F 3/067; G06F 3/0655; G06F 13/16; G06F 2213/16
See application file for complete search history.

(56) References Cited

U.S. PATENT DOCUMENTS

| 6,567,397 | B1 | 5/2003 | Campana et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Farley Abad
(74) *Attorney, Agent, or Firm* — Ryan, Mason & Lewis, LLP

(57) ABSTRACT

An apparatus comprises a processing device comprising a processor coupled to memory. The processing device is configured to obtain maintenance information comprising an indication that a port of a storage system is scheduled for a maintenance activity and to determine that a host device utilizes the port for communication with the storage system. The processing device is further configured to issue an alert to the host device. The alert is configured to cause the host device to set a path associated with the port to a standby mode. The standby mode is configured to inhibit input-output operations from being submitted to the storage system along the path.

20 Claims, 4 Drawing Sheets

(56) References Cited

U.S. PATENT DOCUMENTS

| | | | |
|---|---|---|---|
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 7,962,567 | B1* | 6/2011 | Sandstrom ............ H04L 67/125 709/217 |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,400,611 | B1 | 7/2016 | Raizen |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,639 | B2 | 12/2019 | Mallick et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0253569 | A1* | 11/2006 | Tamura ................ G06F 3/067 709/224 |
| 2006/0277383 | A1 | 12/2006 | Hayden et al. |
| 2007/0124535 | A1* | 5/2007 | Kashima ................ G06F 3/067 711/114 |
| 2007/0174849 | A1 | 7/2007 | Cheung et al. |
| 2008/0043973 | A1 | 2/2008 | Lai et al. |
| 2008/0082748 | A1* | 4/2008 | Liu ...................... G06F 3/0619 711/114 |
| 2008/0201458 | A1 | 8/2008 | Salli |
| 2010/0313063 | A1 | 12/2010 | Venkataraja et al. |
| 2011/0170405 | A1* | 7/2011 | Beecroft ................ H04L 49/25 370/217 |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2015/0212853 | A1* | 7/2015 | Makino ............... G06F 11/3072 718/103 |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0145874 | A1* | 5/2018 | Steeves ................ H04L 41/069 |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |
| 2020/0007437 | A1* | 1/2020 | Keshava ................ H04L 45/12 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

U.S. Appl. No. 15/795,653 filed in the name of Maneesh Pusalkar et al. on Oct. 27, 2017, and entitled "Storage System with Network-Wide Configurable Device Names."

U.S. Appl. No. 16/142,274 filed in the name of Sanjib Mallick et al. on Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. on Sep. 28, 2018, and entitled "Host Device with Multi-Path Layer Implementing Path Selection Based At Least In Part on Fabric Identifiers."

U.S. Appl. No. 16/155,429 filed in the name of Rimpesh Patel et al. on Oct. 9, 2018, and entitled "Categorizing Host IO Load Pattern and Communicating Categorization to Storage System."

U.S. Appl. No. 16/155,491 filed in the name of Kundan Kumar et al. on Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

* cited by examiner

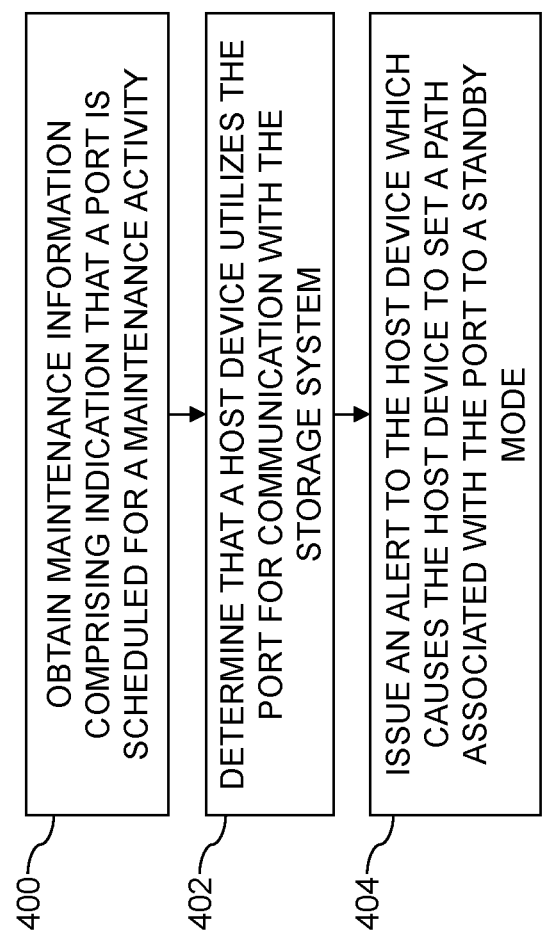

STORAGE SYSTEM PORT MAINTENANCE INFORMATION SHARING WITH HOST DEVICE

FIELD

The field relates generally to information processing systems, and more particularly to storage in information processing systems.

BACKGROUND

Storage arrays and other types of storage systems are often shared by multiple host devices over a network. A host device may comprise a multi-path input-output (MPIO) driver that is configured to process input-output (IO) operations for delivery from the host device to the storage system. The IO operations are delivered along a plurality of paths to the ports of the storage system. In some cases, the storage system may perform maintenance on one or more of the ports which requires that the ports be shut down or otherwise unavailable for use by the host devices.

SUMMARY

In one embodiment, an apparatus comprises a processing device comprising a processor coupled to memory. The processing device is configured to obtain maintenance information comprising an indication that a port of a storage system is scheduled for a maintenance activity and to determine that a host device utilizes the port for communication with the storage system. The processing device is further configured to issue an alert to the host device. The alert is configured to cause the host device to set a path associated with the port to a standby mode. The standby mode is configured to inhibit input-output operations from being submitted to the storage system along the path.

These and other illustrative embodiments include, without limitation, apparatus, systems, methods and computer program products comprising processor-readable storage media.

BRIEF DESCRIPTION OF THE DRAWINGS

FIG. 4 is a flow diagram of an example process for maintenance information sharing with host devices in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
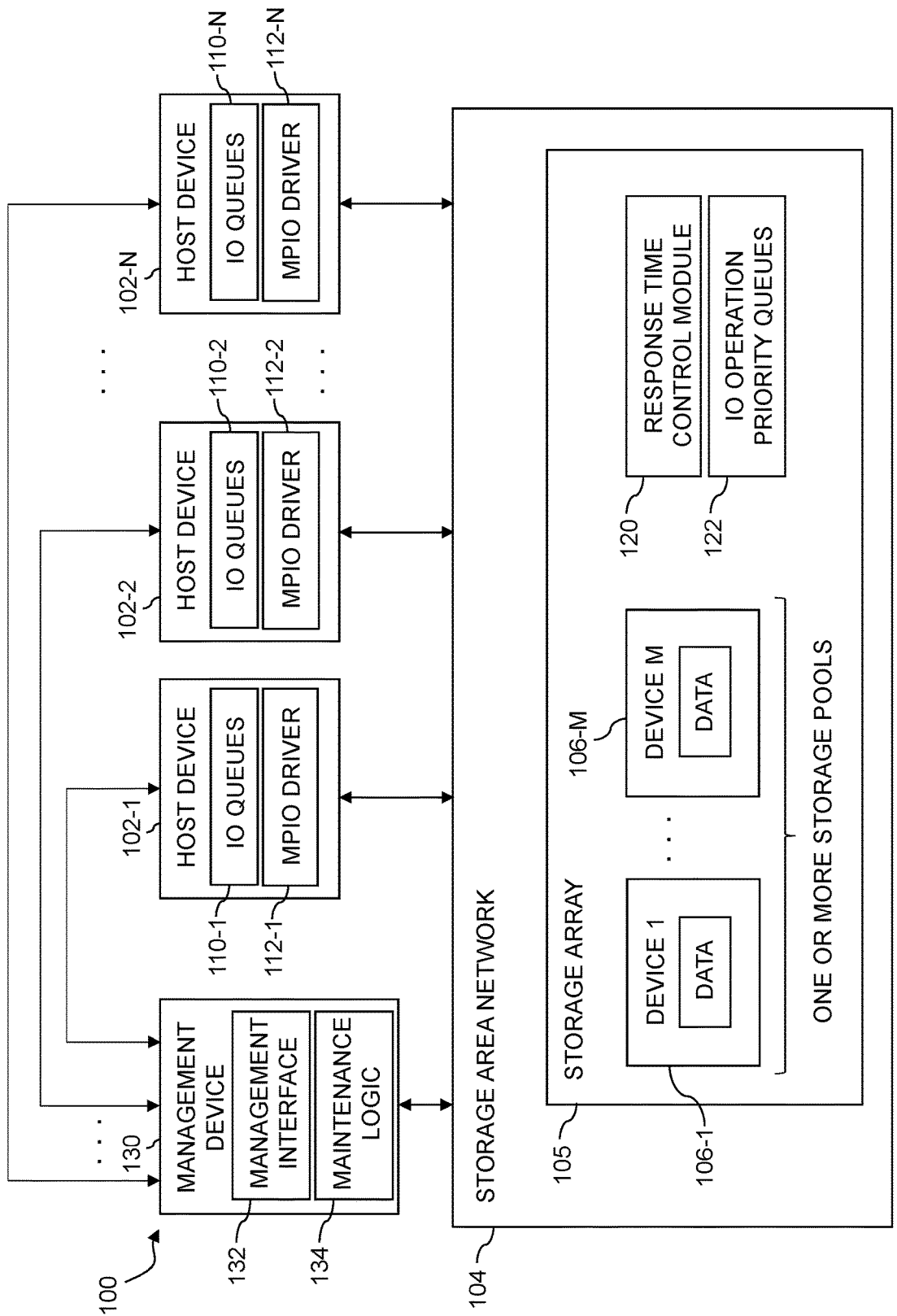
FIG. 1 is a block diagram of an information processing system configured with functionality for maintenance information sharing with host devices in an illustrative embodiment.

FIG. 1 shows an information processing system 100 configured in accordance with an illustrative embodiment. The information processing system 100 comprises a plurality of host devices 102-1, 102-2, . . . 102-N, referred to herein collectively as host devices 102. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

The host devices 102 and storage array 105 may also communicate with a management device 130 either over the SAN 104 or over one or more other network connections. For example, in some embodiments, the host devices 102, the storage array 105, or both, may communicate with the management device 130 over one or more network connections that are separate and distinct from the SAN 104. Management device 130 is configured to monitor the host devices 102 and to obtain information about the host devices 102 and their usage of the storage array 105. Management device 130 also comprises a management interface 132, e.g., a graphical user interface, that may be presented to a user such as, e.g., an administrator, to provide the information to the user. In some embodiments, one or more of host devices 102 may comprise the management device 130.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104, storage array 105 and management device 130 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage array 105 and the management device 130 may be implemented on respective distinct processing platforms, although numerous other arrangements are possible. For example, in some embodiments at least portions of the host devices 102, the storage array 105 and the management device 130 are implemented on the same processing platform. The storage array 105 can therefore be implemented at least in part within at least one processing platform that implements at least a subset of the host devices 102 and the management device 130.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other available paths in the multi-path logical device.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC, suitably modified in the manner disclosed herein to implement at least a portion of functionality for maintenance information sharing with host devices. Other types of MPIO drivers from other driver vendors may be suitably modified to incorporate at least a portion of functionality for maintenance information sharing with host devices as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019, the entirety of which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 and management device 130 are possible, in which certain ones of the host devices 102 and management device 130 reside in one data center in a first geographic location while other ones of the host devices 102 and management device 130 reside in one or more other data centers in one or more other geographic locations that are potentially remote from the first geographic location. Thus, it is possible in some implementations of the system 100 for different ones of the host devices 102 and management device 130 to reside in different data centers than the storage array 105.

Numerous other distributed implementations of the host devices 102, management device 130 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, management device 130, management interface 132 and maintenance logic 134 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In a host device running multipath software, the multipath layer typically sits above the SCSI and HBA layers. When the multipath layer dispatches an IO operation, it first goes to the SCSI layer, then the HBA Layer and then conveyed down the communication link to a port of the storage array.

Figure 2:
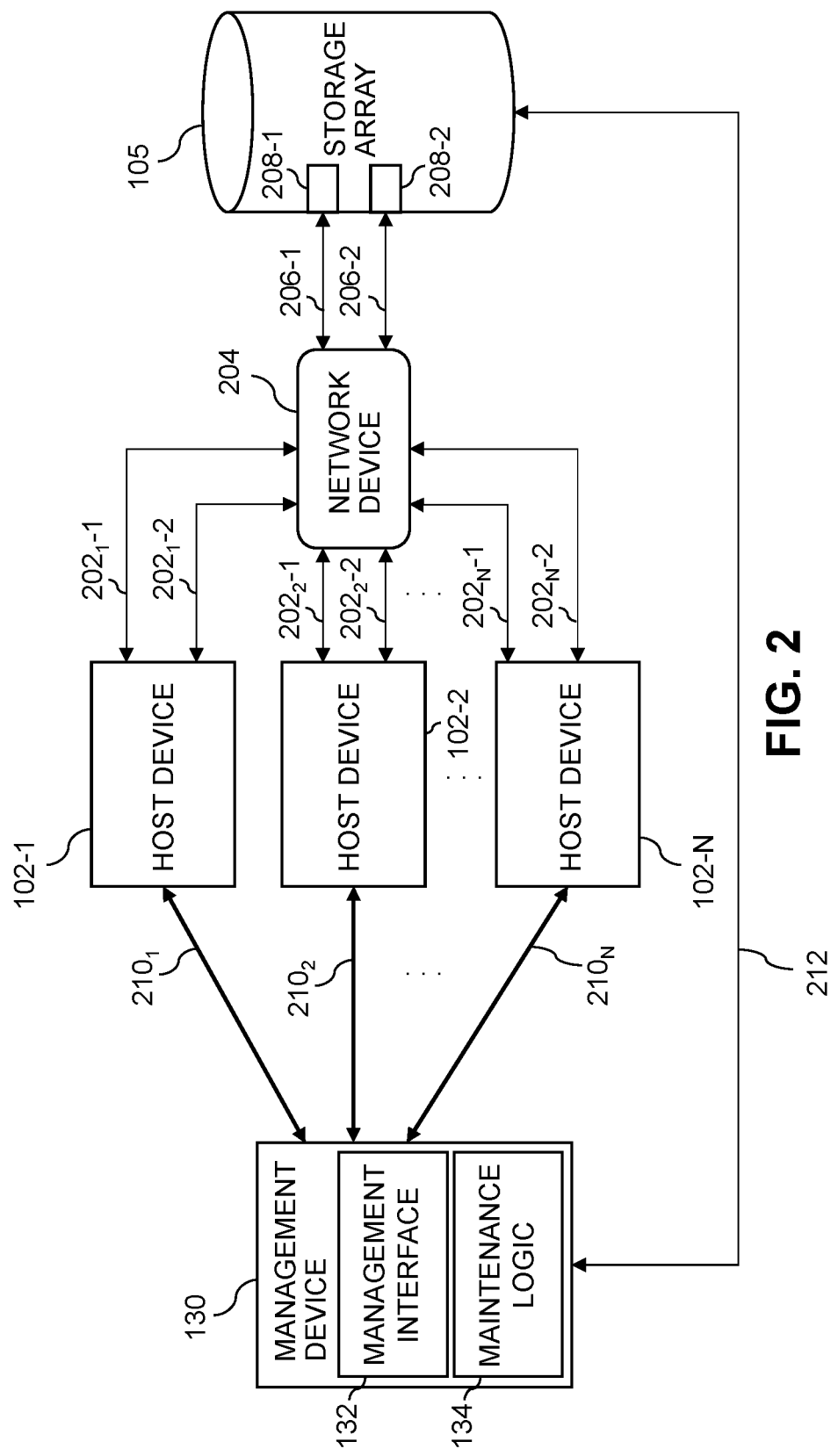
FIG. 2 is a block diagram illustrating an example implementation of the information processing system of FIG. 1 in an illustrative embodiment.

With reference now to FIG. 2, an example configuration of system 100 is illustrated. In FIG. 2, each of the host devices 102 communicates with the storage array 105 via a plurality of paths which utilize a combination of communication links 202, one or more network devices 204, e.g., a switch, communication links 206, and ports 208. While the example of FIG. 2 only illustrates a single switch, two ports, and a number of communication links, any other number of each of these components may also be present in the storage system and utilized to provide communications between the host devices 102 and the storage array 105.

In the illustrated example, host device 102-1 is connected to the network device 204 using communication links $202_1$-1 and $202_1$-2, host device 102-2 is connected to the network device 204 using communication links $202_2$-1 and $202_2$-2, and host device 102-N is connected to the network device 204 using communication links $202_N$-1 and $202_N$-2. Network device 204 is connected to port 208-1 of the storage array 105 using communication link 206-1 and is connected to port 208-2 of the storage array 105 using communication link 206-2. A given path between a host device and the storage array 105 utilizes one of the communication links 202, the network device 204, one of the communication links 206 and one of the corresponding connected ports 208. Although not illustrated in FIG. 2, each host device may also comprise an HBA connected to at least one of the communication links 202 which may be described as an initiator of a path. Each port 208 may likewise be described as a target of a path.

As an example, a first path between host device 102-1 and storage array 105 in the example of FIG. 2 may comprise communication link $202_1$-1, network device 204, communication link 206-1 and port 208-1. A second path between host device 102-1 and storage array 105 in the example of FIG. 2 may comprise communication link $202_1$-1, network device 204, communication link 206-2 and port 208-2. A third path between host device 102-1 and storage array 105 in the example of FIG. 2 may comprise communication link $202_1$-2, network device 204, communication link 206-1 and port 208-1. A fourth path between host device 102-1 and storage array 105 in the example of FIG. 2 may comprise communication link $202_1$-2, network device 204, communication link 206-2 and port 208-2. In this example, there are four available paths between host device 102-1 and storage array 105. Host devices 102-2, . . . 102-N may have available paths described in a similar manner. In other examples embodiments, where there are a smaller or larger numbers of communication links 202, network devices 204, communication links 206 or ports 208 between the host devices 102 and the storage array 105, a smaller or larger number of paths may alternatively be available.

As seen in FIG. 2, each of the host devices 102 may also communicate with management device 130. For example, as seen in FIG. 2, host device 102-1 may communicate with management device 130 using a communication link $210_1$, host device 102-2 may communicate with management device 130 using a communication link $210_2$, and host device 102-N may communicate with the management device 130 using a communication link 210N. Communication links 210 may be utilized by the host devices 102 to provide information about the host devices 102 and their connections with the storage array 105 to the management device 130. The communication links 210 may also be utilized by the management device 130 to provide commands or instructions to the host devices 102. In some embodiments, communication links 210 may be separate from SAN 104. In some embodiments, SAN 104 may comprise communication links 210.

The management device 130 may also communicate with the storage array 105 via a communication link 212. In some embodiments, the management device 130 is configured to obtain storage array port maintenance information from the storage array 105 via the communication link 212. In some embodiments, the storage array 105 is configured to provide storage array port maintenance information to the maintenance device 130 via the communication link 212. In some embodiments, communication link 212 may be separate from SAN 104. For example, management device 130 may communicate with storage array 105 via a separate network connection. In some embodiments, SAN 104 may comprise communication link 212.

In some storage systems, if a maintenance activity is to be performed on a storage array port, the corresponding paths are set to a standby mode on each of the connected host devices in order to prevent unnecessary input-output (IO) operation delays and latencies in the storage system. This process normally involves separately logging in to each host device and performing the necessary commands so that those paths are no longer available to be selected for IO operations, e.g., by setting a path mode for those paths to a standby mode. Also, when the maintenance activity is finished, the path mode for those paths then typically needs to be manually reset from the standby mode to an active mode on each of these host devices. When a large number of host devices are included in the storage system, such a process may require significant time and effort.

In an example storage array 105, an administrator of the storage array may issue a command to the storage array 105 prior to a scheduled maintenance activity on a port 208 which indicates that the port 208 is scheduled for maintenance. A host device 102 may then periodically send a proprietary command such as, e.g., an SCSI command, to the storage array 105 and receive a response from the storage array 105 comprising an indication of which ports 208 are scheduled for maintenance. The multipath software residing on the host device 102, e.g., the MPIO driver 112, will then set the paths that utilize those ports 208 to an autostandby offline mode. The autostandby offline mode inhibits these paths from being used for IO operations until the ports 208, and thus the paths, become active again. However, such a use of the SAN 104 by the host device 102 to obtain the indication of which ports 208 may result in reduced efficiency and performance of the system where, for example, the bandwidth and processing resources of the host device 102 and SAN 104 would otherwise have been used to service 10 operations.

In illustrative embodiments, maintenance logic 134 residing on a management device 130 is disclosed which is configured with techniques and functionality for causing the host devices 102 to automatically place all of the paths that are connected to a port 208 which is scheduled for maintenance to the autostandby offline mode by causing the management device 130 to issue a command to the host devices 102 via communication links 210. In other embodiments, the management device 130 may execute representational state transfer (REST) application programming interface (API) calls to the storage array 105 via communication link 212 to obtain port maintenance information from the storage array 105 and automatically trigger the host devices 102 to set the corresponding paths to the autostandby offline mode via communication links 210. While described herein as using REST API calls, in other embodiments the management device 130 may communicate with the storage array 105 using any other communication protocol.

The management device 130 is a centralized management console through which the host devices 102 can be monitored. For example, the MPIO drivers 112 residing on the host devices 102 are configured to regularly send path and device information to the management device 130 once the host devices 102 are connected to the management device 130. The management device 130 is configured to generate a list of all connected host devices 102 as well as their respective available devices and paths.

Figure 3:
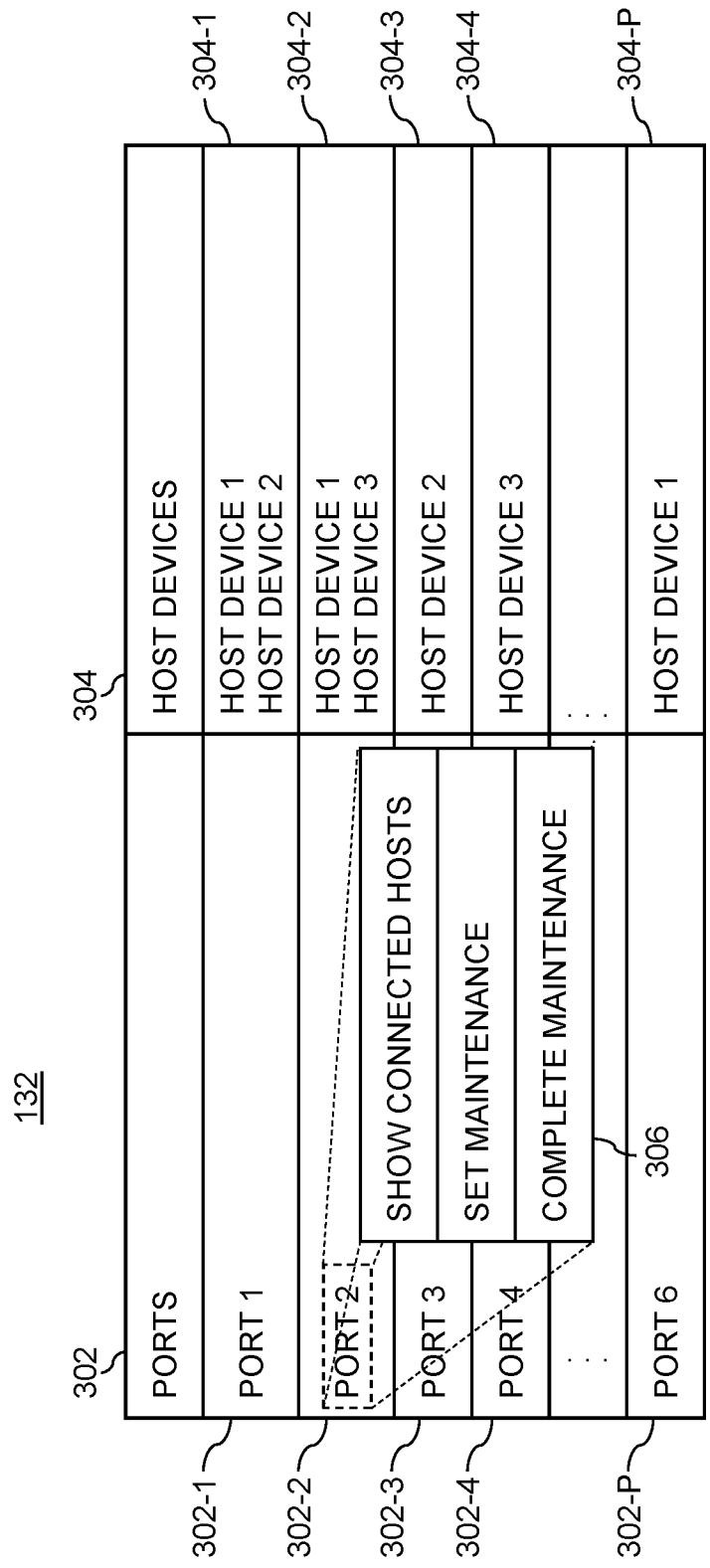
FIG. 3 is an illustration of an example management interface of the information processing system of FIG. 1 in an illustrative embodiment.

With reference to FIG. 3, in some cases, the list may be presented to a user via a management interface 132, e.g., via a graphical user interface presented on a display of a computing device. For example, as seen in FIG. 3, management interface 132 comprises a list of ports 302 of the storage array 105, e.g., ports 302-1, 302-2, 302-3, 302-4 . . . 302-P, and corresponding sets of host devices 304 that utilize each port 302, e.g., host devices 304-1, 304-2, 304-3, 304-4 . . . 304-P. As an example, port 302-1, also listed as port 1, may have a corresponding set of host devices 304-1 which comprises host device 1 and host device 2. As another example, port 302-P, also listed as port 6, may have a corresponding set of host devices 304-P which comprises only host device 1. While referred to as ports 302 and sets of host devices 304 in FIG. 3 for clarity, ports 302 may illustratively comprise any of the ports 208 of FIG. 2 and the sets of host devices 304 may illustratively comprise any of the host devices 102 of FIG. 2.

In some embodiments, the management interface 132 may be enhanced to also include a listing of all of the storage arrays and ports connected to each host device 102. These connected storage arrays and ports may be presented to the user via the management interface 132, for example, in the same view or a separate view.

The ports 302 or other elements of the management interface 132 may be selectively activatable by the user, e.g., for example via a user input device, to present a dialog 306 which provides the user with one or more activatable elements. The user input device may comprise, for example, a keyboard, mouse, touchscreen, or any other user input device commonly included in a computing device.

The activatable elements of the dialog 306 may be activated by user input to change the view presented by the management interface 132, to cause the maintenance logic 134 to trigger a command on the corresponding set of host devices 304 or to take any other action. In one example, the dialog 306 may comprise a show connected hosts element, a set maintenance element and a complete maintenance element, as illustrated in FIG. 3. Any other activatable elements may be included in the dialog 306.

The show connected hosts element of dialog 306 may be activated by the user to cause the management interface 132 to present the set of host devices 304 that corresponds to the selected port 302. For example, initially a list of ports 302 may be presented to the user by the management interface 132. The user may activate port 302-2 to cause the management interface 132 to present the dialog 306 for port 302-2. In the dialog 306, the user may activate the show connected hosts element to cause the management interface 132 to present the corresponding set of host devices 304-2, e.g., host devices 1 and 3. In some cases, a general show connected hosts element may be activated to show the sets of host devices 304 for all ports 302.

The set maintenance element of dialog 306 may be activated by the user to cause maintenance logic 134 to trigger a command on the corresponding set of host devices 304 which causes the corresponding set of host devices 304 to set the corresponding port 302 to the autostandby offline mode. For example, the user may activate port 302-2 to cause the management interface 132 to present the dialog 306 for port 302-2. In the dialog 306, the user may activate the set maintenance element to cause the maintenance logic 134 to trigger a command on the corresponding set of host devices 304-2, e.g., host devices 1 and 3, which causes those host devices to set port 302-2 to the autostandby offline mode. In some embodiments, triggering the command may comprise the maintenance logic 134 causing the management device 130 to submit the command to the corresponding host devices via one or more of the communication links 210.

The complete maintenance element may be activated by the user to cause maintenance logic 134 to trigger a command on the corresponding set of host devices 304 which causes the corresponding set of host devices 304 to set the corresponding port 302 to the active mode. For example, the user may activate port 302-2 to cause the management interface 132 to present the dialog 306 for port 302-2. In the dialog 306, the user may activate the complete maintenance element to cause the maintenance logic 134 to trigger a command on the corresponding set of host devices 304-2, e.g., host devices 1 and 3, which causes those host devices to set port 302-2 to the active mode. In some embodiments, triggering the command may comprise the maintenance logic 134 causing the management device 130 to submit the command to the corresponding host devices via one or more of the communication links 210.

In some cases, the management device 130 is configured to communicate with the host devices 102 and the storage array 105 via out-of-band connections. For example, in such cases, the management device 130 does not utilize the bandwidth of the communication links 202 and 206 between the host devices 102 and the storage array 105 for communicating with the host devices 102 or the storage array 105, thus preserving those connections for servicing IO operations. Instead, management device 130 may be configured to communicate with host devices 102 via communication links 210 and to communicate with the storage array via communication link 212, e.g., a separate network such as a separate LAN between the management device 130 and the storage array 105.

In an example scenario, a component or software of a port 208 needs to be replaced or upgraded. Such a maintenance activity will temporarily require that the paths of the host devices 102 that are connected to that port 208 be disconnected before the maintenance activity is performed and the port 208 is disabled. In such scenario, the paths that are connected to that port 208 may be set to the autostandby offline mode, for example, using maintenance logic 134.

Maintenance logic 134 may be configured to implement one or more techniques for setting the paths that are connected to a particular port 208 to the autostandby offline mode on the corresponding host devices 102.

In a first example technique implemented by maintenance logic 134, the paths that utilize the port 208 may be set to the autostandby offline mode through the use of the REST APIs. For example, an administrator of the storage array 105 may issue a maintenance command through an array management console of the storage array 105 to schedule a maintenance activity on a port.

The maintenance logic 134 may issue periodic REST calls to the storage array 105 to determine whether or not there is any scheduled maintenance activity for the ports 208. For example, the REST calls may be issued to the storage array 105 by the maintenance logic 134 periodically, e.g., every millisecond (ms), second (s), minute, hour, or any other period of time. The storage array 105 returns a response to the REST calls with an indication of whether any maintenance activity has been scheduled. The response may comprise, for example, an indication of a time at which the maintenance activity will start, an indication of which port or ports 208 will be undergoing the maintenance activity, an indication of which storage array 105 the port 208 is part of, any combination thereof or any other maintenance information about the maintenance activity.

If the response indicates that a maintenance activity is scheduled, the maintenance logic 134 issues an alert to each host device 102 that is connected to that port 208. For example, the maintenance logic 134 may compare the maintenance information contained in the response, e.g., the indication of the port 208, to the list of ports 302 and determine which set of host devices 304 utilizes that port 208 for their paths. An alert comprising an indication that that port 208 is undergoing a maintenance activity may then be provided to the host devices 102 in the set of host devices 304 by the maintenance logic 134. In some cases, the alert may comprise a command which triggers the host devices 102 to set the paths that utilize that port 208 to the autostandby offline mode.

When a host device 102 receives the alert, the host device 102 issues an internal input-output control (ioctl) command to tell the MPIO driver 112 to set the paths that utilize that storage array 105 and port 208 to the autostandby offline mode.

During the maintenance activity, the storage array 105 disables the port 208. For example, the functionality of the port 208 may be turned off, disabled or rebooted as part of the maintenance activity. When the MPIO driver 112 determines that the port 208 is offline, the MPIO driver 112 sets the path state for any paths that utilize that port 208 to a dead or unavailable state. After the maintenance activity is complete and the port 208 is reactivated by the storage array 105, the MPIO driver 112 will detect that the port 208 is now alive or available for use and the paths will automatically be returned to an alive or available state. In this case, the mode for the paths will then be automatically set to active by the MPIO driver 112 once the MPIO driver 112 detects that the path is alive or available. The MPIO driver 112 may then submit IO operations along that path to the port 208 as normal.

While described above as using REST APIs, in other embodiments, any other communication protocol may be utilized by management device 130 for communication with the storage array 105 or host devices 102.

In a second example technique implemented by maintenance logic 134, the paths that utilize the port 208 may be set to the autostandby offline mode manually via user input through the management interface 132. For example, the maintenance logic 134 may present the user with the management interface 132 and the user may select, e.g., via a user input device, a particular storage array 105 or port 208 that will be undergoing the maintenance activity.

The user may then issue a maintenance command on that port 208, for example, by activating the set maintenance element in the dialog 306 of the management interface 132 associated with the port 208. The activation of the set maintenance element triggers the maintenance logic 134 to issue an alert to each of the host devices 102 that are connected to that port 208.

When a host device 102 receives the alert, the host device 102 issues an internal input-output control (ioctl) command to tell the MPIO driver 112 to set the paths that utilize that storage array 105 and port 208 to the autostandby offline mode.

During the maintenance activity, the storage array 105 disables the port 208. For example, the functionality of the port 208 may be turned off, disabled or rebooted as part of the maintenance activity. When the MPIO driver 112 determines that the port 208 is offline, the MPIO driver 112 sets the path state for any paths that utilize that port 208 to a dead or unavailable state. After the maintenance activity is complete and the port 208 is reactivated by the storage array 105, the MPIO driver 112 will detect that the port 208 is now alive or available for use and the paths will automatically be returned to an alive or available state. In this case, the mode for the paths will then be automatically set to active by the MPIO driver 112 once the MPIO driver 112 detects that the path is alive or available. The MPIO driver 112 may then submit IO operations along that path to the port 208 as normal.

In one example scenario, the port 208 for which the maintenance activity is scheduled may not actually be disabled by the storage array. For example, even though the maintenance logic 134 obtains an indication that a maintenance activity is scheduled for the port 208 from the storage array 105 or a user input activated the set maintenance element in the management interface 132 and triggers the autostandby mode for the corresponding paths on the host device 102, the actual maintenance activity on that port 208 may not actually be performed on the port 208 as scheduled. For example, the maintenance activity may have been rescheduled, canceled or not performed for any other reason.

In such a scenario, the maintenance logic 134 has already issued the alert to the host devices 102 and the MPIO drivers 112 of the host devices 102 have already set the corresponding paths to the autostandby offline mode. This means that even though the port 208 has not undergone the maintenance activity, these paths are still not alive or available for use by the MPIO drivers 112 to distribute IO operations. In such a case, for example, these paths may be stuck in the autostandby offline mode absent further action by the maintenance logic 134.

This is because the MPIO drivers 112 are typically configured to perform the periodic path testing on each path to determine its state and to determine whether any paths have been added or removed. In the case where the autostandby offline mode is set for a path, the path testing will determine whether or not the path has become dead or unavailable, e.g., due to the corresponding port 208 being disabled, shut down or rebooted. Under normal circumstances, when the MPIO driver 112 detects that a path that is set to the autostandby offline mode has become dead or unavailable and then that the path is alive or available again, e.g., due to the corresponding port 208 being re-activated, the MPIO driver 112 automatically sets that path to the active mode and resumes submission of IO operations along that path.

As part of the path testing, the MPIO driver 112 will know that a path set to the autostandby offline mode has not become dead or unavailable even though the maintenance activity for the corresponding port 208 was scheduled. In an illustrative embodiment, if a threshold amount of time or a target time passes, e.g., seconds, minutes, hours, days, the scheduled maintenance time, or any other threshold amount of time or target time, and the path does not become dead or unavailable, the MPIO driver 112 may be configured to automatically set the mode of the path from the autostandby offline mode to the active mode so that the path can again be used for IO operations.

In some cases, a user input may also or alternatively be received by the management interface 132, e.g., activation of the complete maintenance element of dialog 306 by the user input, which causes maintenance logic 134 to issue an alert to the host devices 102 which triggers the MPIO drivers 112 to set the corresponding paths from the autostandby offline mode to the active mode. In some cases, the maintenance logic 134 may alternatively issue the alert in response to receiving a response from the storage array 105 that the port 208 is no longer scheduled for a maintenance activity.

The disclosed techniques allow maintenance activity on the ports 208 of a storage array 105 to be performed without causing unnecessary IO delays and latencies on the connected host devices 102 which increases efficiency in the storage system. Through the use of periodic REST calls, the maintenance logic 134 is configured to automatically determine that a maintenance activity is scheduled for a port 208 and to automatically issue an alert to the host devices 102 to set the paths which utilize that port 208 to the autostandby offline mode.

Since the polling of the storage array 105 for maintenance activities is offloaded to the management device 130, host device processing cycles may be preserved for use in servicing IO operations. In addition, the bandwidth between the host devices 102 and storage array 105 may also be preserved by using a communication link 212 between the management device 130 and storage array 105 that is separate from the in-band communication pathways between the host devices 102 and storage array 105.

Illustrative embodiments of the techniques and functionality of maintenance logic 134 will now be described in more detail with reference to the flow diagram of FIG. 4.

The process as shown in FIG. 4 includes steps 400 through 404, and is suitable for use in the system 100 but is more generally applicable to other types of systems comprising multiple host devices and a shared storage system.

While the example process of FIG. 4 is described below from the perspective of maintenance device 130, any other device of the system 100 may be configured to perform one or more of the steps of the process of FIG. 4.

At step 400, maintenance logic 134 obtains maintenance information comprising an indication that a port 208 of the storage array 105 is scheduled for a maintenance activity. For example, the maintenance information may be obtained via user input in the management interface 132, obtained from the storage array 105 via one or more REST API calls to the storage array, obtained from the storage array 105 via another communication protocol, received from the storage array 105 in a communication issued by the storage array 105 or in any other manner.

At step 402, maintenance logic 134 determines that the host device 102 utilizes the port 208 for communication with the storage array 105. For example, maintenance logic 134 may determine a list of ports 302 and corresponding sets of host devices 304, e.g., based on port and host device information received from the host devices 102. The maintenance logic 134 may then determine which host devices 102 utilize the port 208 for which the maintenance activity has been scheduled based at least in part on the list of ports 302 and corresponding sets of host devices 304. For example, if maintenance logic 134 obtains maintenance information which indicates that port 302-2 is scheduled for a maintenance activity, the host devices 102 in the set of host devices 304-2 may be determined as the host devices 102 that utilize that port.

At 404, maintenance logic 134 issues an alert to the host devices 102 that utilize the port or ports 208 for which a maintenance activity is scheduled. The alert is configured to cause the host devices 102 to set any paths that are associated with the port or ports 208 to the autostandby offline mode where the autostandby offline mode is configured to inhibit input-output operations from being submitted to the storage array 105 along those paths, as described above.

Separate instances of the process of FIG. 4 may be performed in respective additional management devices or host devices that share the storage array.

The particular processing operations and other system functionality described in conjunction with the flow diagrams of FIG. 4 are presented by way of illustrative example only, and should not be construed as limiting the scope of the disclosure in any way. Alternative embodiments can use other types of processing operations involving host devices, management device, storage systems and maintenance logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different maintenance logic arrangements within a given information processing system.

Functionality such as that described in conjunction with the flow diagram of FIG. 4 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for maintenance information sharing with host devices are carried out at least in part under the control of maintenance logic 134. For example, maintenance logic 134 is illustratively configured to control performance of portions of the process shown in the flow diagram described above in conjunction with FIG. 4.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform at least a portion of the disclosed functionality for maintenance information sharing with host devices. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support maintenance information sharing with host devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for maintenance information sharing with host devices as disclosed herein, IO operations may be routed along pathways that utilize ports which are undergoing maintenance. This may result in increased latency as these IO operations await timeouts before failing over to alternative paths.

Such drawbacks are advantageously overcome in illustrative embodiments herein by utilization of maintenance logic 134 to implement functionality for maintenance information sharing with host devices as described above. For example, by providing functionality for determining when ports are scheduled for a maintenance activity and triggering the MPIO drivers of the host devices to set the paths that utilize those ports to a standby mode, IO operations are inhibited from utilizing those paths thereby avoiding increased latency due to timeouts while those ports are undergoing maintenance. In addition, by utilizing communication links between the management device the host devices that are separate from the communication links between the host devices and the storage array, bandwidth and congestion on the in-band communication links between the host devices and the storage array may be avoided. Also, by utilizing a communication link between the management device and the storage array that is separate from the in-band communication links, bandwidth and congestion may also be avoided. By determining whether or not the ports set to the autostandby offline mode and scheduled for a maintenance activity have actually become dead or unavailable within a threshold amount of time or by a target time, wasted processing and bandwidth associated with the ports when the maintenance activity is not actually performed on the ports as scheduled may also be mitigated.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104, storage array 105 and management device 130 are illustratively implemented in the form of software running on one or more processing devices. As a more particular example, the maintenance logic 134 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, maintenance logic and management devices. Also, the particular configurations of system and device elements and associated processing operations illustratively shown in the drawings can be varied in other embodiments. For example, a wide variety of different management device configurations and associated maintenance logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
 a processing device comprising a processor coupled to memory, the processing device being configured:
  to obtain maintenance information from a storage system, the maintenance information comprising an indication that a port of the storage system is scheduled for a future maintenance activity;
  to determine that a host device utilizes the port for communication with the storage system via a first network;
  to issue an alert, via a second network that is different than the first network, the alert being configured to cause the host device to set a path associated with the port to a standby mode prior to the future maintenance activity, the standby mode being configured to inhibit input-output operations from being submitted to the storage system along the path;
 wherein the host device is configured to set the path to an active mode based at least in part on a determination by the host device that the path associated with the port did not become unavailable due to the port maintenance activity and a threshold amount of time has passed since the alert was issued.

2. The apparatus of claim 1 wherein obtaining the maintenance information comprises obtaining the maintenance information from the storage system via at least one of the second network and at least one other network that is different than the first network.

3. The apparatus of claim 2 wherein:
obtaining the maintenance information from the storage system via the at least one of the second network and the at least one other network comprises submitting at least one query to the storage system; and
receiving the maintenance information in response to the submitted at least one query.

4. The apparatus of claim 1 wherein:
the storage system is configured to indicate to the processing device that the port is scheduled for the maintenance activity; and
obtaining the maintenance information comprises receiving the indication that the port is scheduled for the maintenance activity from the storage system.

5. The apparatus of claim 1 wherein:
the processing device is configured to determine a list of ports of the storage system, the list of ports comprising the port;
the processing device is configured to present an interface to a user, the interface being configured to present the list of ports to the user;
obtaining the maintenance information comprises receiving an activation of a maintenance element associated with the port in the interface; and
the host device is configured to set the path to the active mode based at least in part on a second alert issued by the processing device, the second alert being configured to cause the host device to set the path to the active mode.

6. The apparatus of claim 5 wherein:
the interface is configured to determine a set of host devices that correspond to each port in the list of ports;
the interface is configured to present the set of host devices in association with the list of ports to the user; and
determining that the host device utilizes the port for communication with the storage system comprises determining that the host device is included in the set of host devices that correspond to the port.

7. The apparatus of claim 1 wherein the host device is configured to set the path to the active mode based at least in part a determination by the host device that the path became unavailable due to the port maintenance activity followed by a determination by the host device that the path is available.

8. A method comprising:
obtaining maintenance information from a storage system, the maintenance information comprising an indication that a port of the storage system is scheduled for a future maintenance activity;
determining that a host device utilizes the port for communication with the storage system via a first network; and
issuing an alert, via a second network that is different than the first network, the alert being configured to cause the host device to set a path associated with the port to a standby mode prior to the future maintenance activity, the standby mode being configured to inhibit input-output operations from being submitted to the storage system along the path;
wherein the host device is configured to set the path to an active mode based at least in part on a determination by the host device that the path associated with the port did not become unavailable due to the port maintenance activity and a threshold amount of time has passed since the alert was issued;
wherein the method is implemented by a processing device comprising a processor coupled to a memory.

9. The method of claim 8 wherein obtaining the maintenance information comprises obtaining the maintenance information from the storage system via at least one of the second network and at least one other network that is different than the first network.

10. The method of claim 9 wherein:
obtaining the maintenance information from the storage system via the at least one of the second network and the at least one other network comprises submitting at least one query to the storage system; and
receiving the maintenance information in response to the submitted at least one query.

11. The method of claim 8 wherein:
the storage system is configured to indicate to the processing device that the port is scheduled for the maintenance activity; and
obtaining the maintenance information comprises receiving the indication that the port is scheduled for the maintenance activity from the storage system.

12. The method of claim 8 wherein the method further comprises:
determining a list of ports of the storage system, the list of ports comprising the port; and
presenting an interface to a user, the interface being configured to present the list of ports to the user;
wherein obtaining the maintenance information comprises receiving an activation of a maintenance element associated with the port in the interface; and
the host device is configured to set the path to the active mode based at least in part on a second alert issued by the processing device, the second alert being configured to cause the host device to set the path to the active mode.

13. The method of claim 12 wherein the method further comprises:
determining a set of host devices that correspond to each port in the list of ports; and
presenting the set of host devices in association with the list of ports to the user; and
wherein determining that the host device utilizes the port for communication with the storage system comprises determining that the host device is included in the set of host devices that correspond to the port.

14. The method of claim 8 wherein the host device is configured to set the path to the active mode based at least in part on a determination by the host device that the path became unavailable due to the port maintenance activity followed by a determination by the host device that the path is available.

15. A computer program product comprising a non-transitory processor-readable storage medium having stored therein program code of one or more software programs, wherein the program code, when executed by a processing device comprising a processor coupled to memory, causes the processing device:

to obtain maintenance information from a storage system, the maintenance information comprising an indication that a port of the storage system is scheduled for a future maintenance activity;

to determine that a host device utilizes the port for communication with the storage system via a first network; and to issue an alert, via a second network that is different than the first network, the alert being configured to cause the host device to set a path associated with the port to a standby mode prior to the future maintenance activity, the standby mode being configured to inhibit input-output operations from being submitted to the storage system along the path;

wherein the host device is configured to set the path to an active mode based at least in part on a determination by the host device that the path associated with the port did not become unavailable due to the port maintenance activity and a threshold amount of time has passed since the alert was issued.

16. The computer program product of claim 15 wherein obtaining the maintenance information comprises obtaining the maintenance information from the storage system via at least one of the second network and at least one other network that is different than the first network.

17. The computer program product of claim 16 wherein:

obtaining the maintenance information from the storage system via the at least one of the second network and the at least one other network comprises submitting at least one query to the storage system; and receiving the maintenance information in response to the submitted at least one query.

18. The computer program product of claim 15 wherein:

the storage system is configured to indicate to the processing device that the port is scheduled for the maintenance activity; and obtaining the maintenance information comprises receiving the indication that the port is scheduled for the maintenance activity from the storage system.

19. The computer program product of claim 15 wherein the program code further causes the processing device:

to determine a list of ports of the storage system and a set of host devices that correspond to each port in the list of ports, the list of ports comprising the port; and to present an interface to a user, the interface being configured to present the list of ports and the set of host devices in association with the list of ports to the user; and wherein:

obtaining the maintenance information comprises receiving an activation of a maintenance element associated with the port in the interface;

determining that the host device utilizes the port for communication with the storage system comprises determining that the host device is included in the set of host devices that correspond to the port; and the host device is configured to set the path to the active mode based at least in part on a second alert issued by the processing device, the second alert being configured to cause the host device to set the path to the active mode.

20. The computer program product of claim 15 wherein the host device is configured to set the path to the active mode based at least in part on a determination by the host device that the path became unavailable due to the port maintenance activity followed by a determination by the host device that the path is available.

* * * * *